United States Patent

Wanken et al.

Patent Number: 5,910,624
Date of Patent: Jun. 8, 1999

[54] DISPERSE DYESTUFF MIXTURES

[75] Inventors: Klaus-Wilfried Wanken, Leverkusen; Karl-Ulrich Bühler, Alzenau, both of Germany

[73] Assignee: DyStar Textilfarben GmbH & Co. Deutschland KG, Germany

[21] Appl. No.: 08/919,005

[22] Filed: Aug. 27, 1997

[30] Foreign Application Priority Data

Sep. 9, 1996 [DE] Germany .......................... 196 36 380

[51] Int. Cl.⁶ ................ D06P 3/87; D06P 3/36; D06P 1/18
[52] U.S. Cl. ...................... 8/533; 8/639; 8/922
[58] Field of Search ................ 8/639, 922, 533

[56] References Cited

U.S. PATENT DOCUMENTS

| | | | |
|---|---|---|---|
| 4,502,863 | 3/1985 | Bornatsch et al. | 8/524 |
| 4,523,926 | 6/1985 | Brandt et al. | 8/639 |
| 4,559,162 | 12/1985 | Abel et al. | 252/321 |
| 4,802,889 | 2/1989 | Bte et al. | 8/639 |
| 4,908,042 | 3/1990 | Bühler et al. | 8/639 |
| 4,968,318 | 11/1990 | Wiegner et al. | 8/639 |

FOREIGN PATENT DOCUMENTS

| | | |
|---|---|---|
| 376 086 | 12/1989 | European Pat. Off. |
| 684 287 | 4/1995 | European Pat. Off. |
| 301 134 | 9/1996 | European Pat. Off. |
| 2 936 489 | 3/1980 | Germany . |
| 2936489 | 3/1980 | Germany . |
| 44 17 699 | 11/1995 | Germany . |
| 35 08 904 | 9/1996 | Germany . |
| 640 560 | 1/1984 | Switzerland . |
| 2 030 169 | 9/1978 | United Kingdom . |
| 2 030 169 | 9/1979 | United Kingdom . |

*Primary Examiner*—Margaret Einsmann
*Attorney, Agent, or Firm*—Connolly & Hutz

[57] ABSTRACT

Disperse Dyestuff Mixtures comprising C.I. Disperse Red 82 of the formula (I)

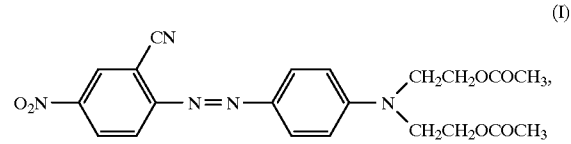

and one or more dyestuffs which differ therefrom, of the formula (II)

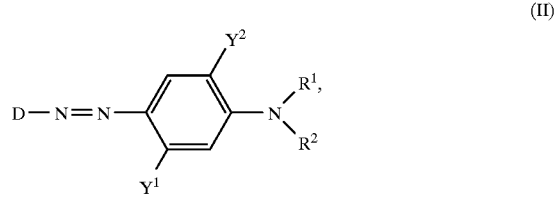

wherein
D denotes the radical of a diazo component of the formula

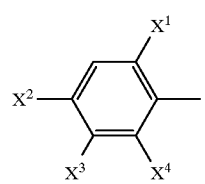

or
D denotes the radical of a diazo component from the group consisting of 5,6-dichlorobenzothiazol-2-yl, 6,7-dichlorobenzothiazol-2-yl, 6-nitro-benzothiazol-2-yl or 5-nitrothiazol-2-yl, and the other substituents have the meaning given in the description,
are stable to spray-drying and have outstanding use properties, in particular in the dyeing of hydrophobic fiber materials.

11 Claims, No Drawings

DISPERSE DYESTUFF MIXTURES

The invention relates to disperse dyestuff mixtures comprising C.I. Disperse Red 82, preparations comprising these and their use for dyeing and printing hydrophobic materials, in particular synthetic fibres.

The disperse dyestuff C.I. Disperse Red 82, which corresponds to the formula (I)

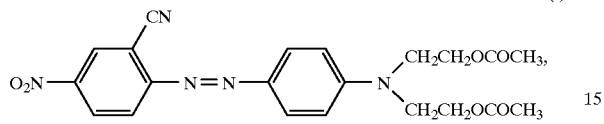

(I)

is known, for example, from DE-A-29 36 489, and is used in particular for dyeing and printing synthetic fibres.

If this dyestuff of interesting colour shade is to be processed as an individual dyestuff to give a dry dyestuff preparation, such as powder or granules, in particular by spray drying an aqueous slurry, this often leads to a dried product with unsatisfactory use properties when the drying parameters customary in practice are applied. Thus, for example, this product can be only poorly redispersed in water.

In spray driers customary in practice, the intake and discharge temperatures and the falling zone available for drying are as a rule coordinated with one another such that optimum products are obtained. For C.I. Disperse Red 82, however, the use of customary spray driers with the customary drying parameters often leads to the disadvantages mentioned.

When C.I. Disperse Red 82 is employed for cheese and beam dyeings in so-called dyeing autoclaves with high dyestuff concentrations in the dye liquor, agglomerations and filter effects continue to occur in practice during the heating-up phase to the desired dyeing temperature of >130° C. This leads on the one hand to marked variations in flow with a simultaneous increase in pressure in the system, and on the other hand to filter effects of the dyestuff and therefore to non-level dyeings and abrasion. Furthermore, the sometimes severe increase in pressure can lead to the dyeing apparatuses being switched off for safety reasons.

The object of the present invention was thus to provide C.I. Disperse Red 82 in a form which is stable to spray drying and no longer has the disadvantages described.

New disperse dyestuff mixtures have now been found comprising C.I. Disperse Red 82 of the formula (I)

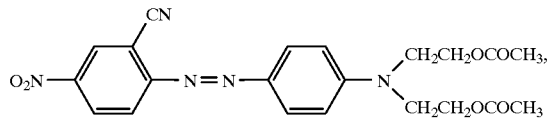

(I)

and at least one dyestuff which differs therefrom, of the formula (II)

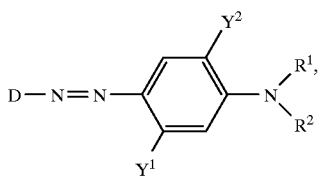

(II)

wherein
D either denotes the radical of a diazo component of the formula (III)

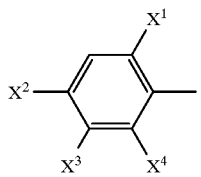

(III)

wherein
$X^1$ represents hydrogen, halogen, in particular chlorine and bromine, nitro, cyano or $C_1$–$C_4$-alkylsulphonyl, in particular methylsulphonyl,
$X^2$ represents nitro, cyano, $C_1$–$C_4$-alkylsulphonyl, in particular methylsulphonyl, halogen, in particular chlorine and bromine, $C_1$–$C_4$-alkoxycarbonyl, in particular methoxycarbonyl and ethoxycarbonyl, or $C_1$–$C_4$-alkyl, in particular methyl,
$X^3$ represents hydrogen or halogen, in particular chlorine and bromine, and
$X^4$ represents hydrogen, halogen, in particular chlorine and bromine, or cyano, or
D denotes the radical of a diazo component from the group consisting of 5,6-dichlorobenzothiazol-2-yl, 6,7-dichlorobenzothiazol-2-yl, 6-nitrobenzothiazol-2-yl and 5-nitrothiazol-2-yl,
$Y^1$ represents hydrogen, halogen, in particular chlorine and bromine, $C_1$–$C_4$-alkyl, in particular methyl, $C_1$–$C_4$-alkoxy, in particular methoxy, acylamino, in particular acetamino and propionylamino, methoxy- or ethoxyacetamino, 2-methoxy- or -ethoxypropionylamino, 2-chloropropionylamino or methylsulfonylamino,
$Y^2$ represents hydrogen, halogen, in particular chlorine, $C_1$–$C_4$-alkyl, in particular methyl, $C_1$–$C_4$-alkoxy, in particular methoxy and ethoxy, or 2-methoxyethoxy, and
$R^1$ and $R^2$ independently of one another denote optionally substituted $C_1$–$C_4$-alkyl.

Preferred substituents which may be mentioned for the $C_1$–$C_4$-alkyl radicals or $R^1$ and $R^2$ are: acyloxy, in particular acetoxy and propionyloxy, CN, $C_1$–$C_4$-alkoxy, in particular methoxy, ethoxy, propoxy and butoxy, phenoxy, phenyl and $C_1$–$C_4$-alkoxycarbonyl, in particular methoxycarbonyl and ethoxycarbonyl.

$R^1$ and $R^2$ particularly preferably independently of one another represents methyl, ethyl, n-propyl, n-butyl, 2-acetoxyethyl, 2-propionyloxyethyl, 4-acetoxybutyl, 4-propionyloxybutyl, 2-cyanoethyl, 4-cyanobutyl, 2-methoxy-, -ethoxy-, -propoxy- or -butoxyethyl, 4-methoxy or -ethoxybutyl, 2-methoxy- or -ethoxycarbonylethyl, 3-methoxy- or -ethoxycarbonylpropyl, benzyl, 2-phenethyl or 2-phenoxyethyl.

If one of the radicals $R^1$ or $R^2$ denotes benzyl, 2-phenylethyl or 2-phenoxyethyl, the other of the two radicals preferably has another meaning.

The dyestuffs of the formula (II) are likewise known, for example from EP-A-684 287 or EP-A-196 537.

In a particularly preferred embodiment, D denotes the radical of a diazo component of the formula (III) wherein $X^1$ represents hydrogen, chlorine, bromine, cyano or nitro, in particular chlorine, cyano or nitro, $X^2$ represents nitro, cyano, methylsulphonyl, methoxycarbonyl or ethoxycarbonyl, in particular nitro, $X^3$ denotes hydrogen, and $X^4$ represents hydrogen or chlorine, in particular hydrogen, or, if $X^1$ represents cyano and $X^3$ represents methyl, $X^4$ denotes cyano.

Particularly preferred mixture components of the formula (I) have 2-chloro-4-nitrophenyl or 2-cyano-4-nitrophenyl as the radical D.

Preferred mixture components of the formula (II) are those wherein $Y^1$ represents hydrogen, chlorine, methyl, acetamino, propionylamino, 2-methoxypropionylamino or methylsulphonylamino, in particular hydrogen, methyl, acetamino or propionylamino.

Mixture components of the formula (II) which are also preferred are those wherein $Y^2$ represents hydrogen.

Dyestuff mixtures which are also preferred are those comprising the dyestuff mixture according to the invention with a mixture component of the formula (II) wherein $R^1$ and $R^2$ independently of one another denote 2-acetoxyethyl, 2-propionyloxyethyl, 2-cyanoethyl, 2-methoxyethyl, 2-ethoxyethyl, 2-methoxycarbonylethyl, 2-ethoxycarbonylethyl, ethyl, n-propyl, 2-phenylethyl or 2-phenoxyethyl.

Preferred dyestuff mixtures according to the invention are those which comprise 70 to 99.5% by weight of C.I. Disperse Red 82 of the formula (I) and 30 to 0.5% by weight of one or more dyestuffs which differ from formula (I), of the formula (II), in each case based on the sum of the individual dyestuffs.

Particularly preferred dyestuff mixtures comprise 80 to 99.5% by weight of C.I. Disperse Red 82 of the formula (I) and 0.5 to 20% by weight, in particular 1 to 15%, particularly preferably 2 to 10%, of one or more dyestuffs which differ from formula (I), of the formula (II), in each case based on the sum of the individual dyestuffs.

In a preferred embodiment, the mixture according to the invention comprises, in addition to the dyestuff of the formula (I), 1 to 3, in particular one dyestuff of the formula (II).

However, the dyestuff mixtures according to the invention can also additionally comprise further dyestuffs in any desired amount, preferably in an amount of up to 10%, based on the total weight of the dyestuffs of the formulae (I) and (II).

The invention furthermore relates to dyestuff preparations which in general comprise:

10–60% by weight of dyestuff mixture according to the invention

10–80% by weight of anionic dispersing agent 0 to 15% by weight of nonionic dispersing agent and, if appropriate, further additives, such as wetting agents, defoamers, dust removal agents and other auxiliaries.

The dyestuff mixtures according to the invention and dyestuff preparations comprising these can be prepared by various processes. For example by:

a) mixing the separately prepared and separately finished individual dyestuffs, preferably before joint drying, b) joint finishing of the separately prepared individual dyestuffs, or c) joint synthesis of the dyestuff mixture.

The term "finishing" is understood as meaning the conversion of a dyestuff, as a rule obtained from a preparation process, into a form customary for the particular intended use. In particular, this is understood as meaning wet bead grinding of the dyestuff in the presence of water, a dispersing agent and, if appropriate, further additives, and, if appropriate, subsequent drying, in particular spray drying.

During joint synthesis of the dyestuff mixture according to the invention, the diazo component of C.I. Disperse Red 82 and that of the desired mixture component or components of the formula (II) are diazotized jointly and coupled jointly to the coupling component of C.I. Disperse Red 82 and to that of the desired mixture component or components of formula (II). This embodiment of the process according to the invention is preferred if the mixture component of the formula (II) has the same diazo component or coupling component as C.I. Disperse Red 82.

In the preparation of the dyestuff mixtures according to the invention by "joint synthesis", the diazo component or components are diazotized in mineral acids or organic carboxylic acids, if appropriate with the addition of water. Organic carboxylic acids are, for example, acetic acid or propionic acid. Mineral acids are, for example, phosphoric acid, hydrochloric acid and, in particular, sulphuric acid.

The dyestuffs are expediently mixed in suitable mills, for example ball or sand mills. However, individually finished dyestuffs can also be mixed by stirring into dye liquors. In order to establish or improve the degree of dispersion of individual dyestuffs or mixtures, one or more dispersing agents are preferably added to the dyestuff mixture to be ground or to the reaction mixture. The particle size of the dyestuff particles can of course be correspondingly influenced and adjusted to a desired value by a grinding treatment, for example wet bead grinding, either during the synthesis or thereafter. Possible dispersing agents for finishing the dyestuff mixtures according to the invention are, in particular, anionic and/or nonionic dispersing agents. The anionic dispersing agents are preferred here, and a mixture of anionic and nonionic dispersing agents is particularly preferred.

Suitable anionic dispersing agents are, in particular, condensation products of aromatic sulphonic acids with formaldehyde, such as condensation products of formaldehyde and alkylnaphthalenesulphonic acids, or of formaldehyde, naphthalenesulphonic acids and benzenesulphonic acids, and condensation products of optionally substituted phenol with formaldehyde and sodium bisulphite. Also suitable, in particular, are ligninsulphonates, for example those which are obtained by the sulphite or kraft process. They are preferably products which are partly hydrolysed, oxidized, propoxylated, sulphonated, sulphomethylated or desulphonated and fractionated by known processes, for example according to the molecular weight or according to the degree of sulphonation. Mixtures of sulphite and kraft ligninsulphonates also show a good action. Ligninsulphonates having an average molecular weight of between 1,000 and 100,000, a content of active ligninsulphonate of at least 80% and, preferably, a low content of polyvalent cations are particularly suitable. The degree of sulphonation can vary within wide limits.

Possible nonionic dispersing agents are, for example: reaction products of alkylene oxides with alkylatable compounds, such as, for example, fatty alcohols, fatty amines, fatty acids, phenols, alkylphenols, arylalkylphenols, carboxylic acid amides and resin acids. These are, for example, ethylene oxide adducts from the class of the reaction products of ethylene oxide with:

a) saturated and/or unsaturated fatty alcohols having 6 to 20 C atoms or b) alkylphenols with 4 to 12 C atoms in the alkyl radical or c) saturated and/or unsaturated fatty amines having 14 to 20 C atoms or d) saturated and/or unsaturated fatty acids having 14 to 20 C atoms or e) hydrogenated and/or non-hydrogenated resin acids.

Possible ethylene oxide adducts are, in particular, the alkylatable compounds mentioned under a) to e) with 5 to 30 mol of ethylene oxide.

Suitable wetting agents are, for example $C_6$–$C_{10}$-alkyl phosphates or addition products of $C_6$–$C_{18}$-fatty alcohols and ethylene oxide and/or propylene oxide, or mixtures of such alkoxylation products.

Suitable defoamers are, for example, tributyl phosphate or 2,4,7,9-tetramethyl-5-decyne-4,7-diole.

Suitable dust removal agents are, for example, those based on mineral oil.

Further auxiliaries are understood as meaning, for example, fungicides, such as, for example, sodium o-phenylphenolate or sodium chlorophenolate, agents which prevent drying on, and those which act as oxidizing agents, such as, for example, sodium m-nitrobenzenesulphonate, frostproofing agents or hydrophilizing agents and the like.

Preferred solid dyestuff preparations comprise

| | |
|---|---|
| 10 to 50% by weight | of dyestuff mixture according to the invention, |
| 10 to 80% by weight | of ligninsulphonates, in particular kraft and sulphite lignins, |
| 0 to 20% by weight | of a condensation product of naphthalenesulphonic acid and formaldehyde, |
| 0 to 10% by weight | of nonionic dispersing agent, in particular addition products of resin acids and ethylene oxide and/or propylene oxide, |
| 0 to 1.5 % by weight | of wetting agent, |
| 0.1 to 1% by weight | of defoamer and |
| 0.2 to 1.5% by weight | of dust removal agent, | in each case based on the total preparation.

Preferred liquid dyestuff preparations comprise

| | |
|---|---|
| 10 to 30% by weight | of dyestuff mixture according to the invention, |
| 10 to 30% by weight | of lignin sulphonates, in particular kraft and sulphite lignins, |
| 0 to 10% by weight | of a condensation product of naphthalenesulphonic acid and formaldehyde, |
| 0 to 10% by weight | of nonionic dispersing agent, in particular addition products of resin acids and ethylene oxide and/or propylene oxide, |
| 0.1 to 1% by weight | of defoamer, |
| 0.1 to 0.5% by weight | of preservative, |
| 0 to 15% by weight | of frostproofing agent, in particular glycerol, and |
| 79.8 to 10% by weight | of water, | in each case based on the total preparation.

Possible preservatives are, for example, the following: isothiazolidone, for example 1,2-benzisothiazol-3-(2H)-one, chloro-2-methyl-4-isothiazolin-3-one or 2-methyl-4-isothiazolin-3-one, pentachlorophenol sodium, 1,3,5-triethylolhexahydro-s-triazine or mixtures thereof.

Dyeing of the fibre material mentioned using the dyestuff mixtures according to the invention and the respective dyestuff preparations is carried out in a manner known per se, preferably from aqueous suspension, if appropriate in the presence of carriers, in general at 80 to 110° C. by the exhaust process, or by the HT process in a dyeing autoclave at 110 to 140° C. Very deep red dyeings with very good fastness properties are obtained in this manner. The preparations according to the invention of the dyestuff mixtures should preferably be present in the dye liquors employed in the above applications in as finely divided a form as possible. The fine division of the dyestuffs is ensured by suspending the individual dyestuffs or the dyestuff mixtures in a liquid medium, preferably in water, together with dispersing agents, and exposing the dyestuff mixture to the action of shearing forces, the dyestuff particles originally present being comminuted mechanically to the extent that an optimum specific surface area is achieved and sedimentation of the dyestuff is avoided. The particle size of the dyestuff is in general between 0.1 and 5 μm, preferably between 0.5 and 1 μm. The dispersing agents co-used in the grinding operation can be the nonionic or ionic dispersing agents already mentioned in connection with the synthesis and preparation of the dyestuff mixture.

Solid preparations (powder or granule preparations) are preferred for most fields of use.

A preferred preparation process for solid dyestuff formulations comprises removing the liquid, in particular the water, from the liquid dyestuff dispersions described above, for example by vacuum drying, freeze drying, by drying on roller dryers, but preferably by spray drying.

In order to prepare the dyestuff mixtures according to the invention in finely divided form, the procedure can be as follows: for example, 10 to 50 parts of a dyestuff mixture are ground with 10 to 80 parts of ligninsulphonate, 0 to 20 parts of a condensation product of naphthalenesulphonic acids and formaldehyde, 10 to 0 parts of a nonionic dispersing agent, 0 to 1.5 parts of a wetting agent, 0.1 to 1.0 part of a defoamer and 0.2 to 1.5 parts of a dust removal agent in a bead mill with water in an amount such that the dispersion has a solids content of 5 to 60% (parts=parts by weight).

In the preparation of the solid dyestuff preparations, a dust removal agent can also be added to the suspension to be sprayed before the drying, preferably in an amount of 0.1 to 1.5 parts.

The dyestuff mixtures according to the invention, in particular in the form of their solid preparations, have better wetting properties during the preparation of dye and padding liquors and also of printing pastes than C.I. Disperse Red 82 dyestuff by itself, and can be dispersed rapidly and without expensive manual or mechanical stirring. The liquors and printing pastes are homogeneous and can be processed in modern dye kitchens without problems, without blocking the nozzles of the metering machines.

The liquid preparations do not tend towards phase separation, and in particular do not tend towards sedimentation and putty-like settling. Similarly expensive homogenization of the dyestuff in the container before removal of the dyestuff can thus be omitted.

The ground paste obtained after grinding of the dyestuff in the presence of the dispersing agents and auxiliaries during preparation of powders is stable even at elevated temperature and over a relatively long period of time. The ground paste does not need to be cooled while it is in the mills or after it has left the mills, and can be stored in collection tanks for a relatively long time before the spray drying. Another advantage is that the spray drying can be carried out at high temperatures without the material to be dried agglomerating. An increase in the intake temperature while maintaining the same dryer discharge temperature means an increase in dryer output and therefore a reduction in manufacturing costs.

A slurry comprising the dyestuff mixture according to the invention is preferably spray dried in customary spray driers at dryer intake temperatures of 130 to 160° C., preferably 140 to 150° C., and discharge temperatures of 50 to 80° C., preferably 60 to 70° C.

The diazo components of the mixture components (I) and (II) in the dyestuff mixtures according to the invention can be identical or different. If they are identical, the mixture components differ only in their coupling components. However, the coupling components can also be identical, in which case the diazo components must then differ. Both the diazo and the coupling components, however, can also differ.

Alkali metal nitrites, such as, for example, sodium nitrite, in solid form or as an aqueous solution, or nitrosylsulphuric acid are employed as the nitrosating agents. The diazotizing temperature is preferably –5 to 30° C., in particular 0 to 20° C.

The coupling is in general carried out by addition of the diazo solution to a solution or suspension of the coupler in the temperature range of 0 to 35° C. The pH of the coupler initially introduced is preferably weakly acid from the coupling. It may be advantageous to add a buffer, such as, for example, sodium acetate.

It is also possible to carry out the coupling by adding the coupler as a weakly acid, for example acetic acid, solution or suspension to the diazo solution. The addition of a buffer may likewise be advantageous in this case.

In order to reduce the filtering time and increase the dyestuff content in the filter cake, it may be advantageous to heat the dyestuff in the coupling mixture to temperatures of 50 to 130° C. after the coupling. The pH of the mixture is also expediently adjusted to a value of 4 to 8 in this case.

The dyestuff dispersions described above can be used very advantageously for mixing printing pastes and dye liquors. They offer particular advantages, for example, in continuous processes, in which the dyestuff concentration of the dye liquors must be kept constant by continuous feeding of dyestuff into the running apparatus.

In order to prepare the dye liquors, the required amounts of the dyestuff formulations which have been prepared in accordance with the above instructions are diluted with the dyeing medium, preferably with water, to the extent that a liquor ratio of 1:5 to 1:50 results for the dyeing. In addition, other dyeing auxiliaries, such as dispersing, wetting and fixing auxiliaries, are in general added to the liquors.

If the dyestuff mixture is to be used for textile printing, the required amounts of the dyestuff formulations are kneaded together with thickening agents, such as, for example, alkali metal alginates or the like, and, if appropriate, further additives, such as, for example, fixing accelerators, wetting agents and oxidizing agents, to give printing pastes.

The invention furthermore relates to the use of the dyestuff mixtures according to the invention for dyeing and printing hydrophobic synthetic materials, preferably fibres, in particular textiles of aromatic polyesters, or mixed textiles of aromatic polyesters and cellulose esters or of aromatic polyesters and wool. They are distinguished by a clear, brilliant colour shade, coupled with a good fastness level.

Possible hydrophobic synthetic materials are, for example: cellulose 2 ½ acetate, cellulose triacetate, polyamides and high molecular weight polyesters. The dyestuff mixtures according to the invention are preferably employed in dyeing and printing materials of high molecular weight polyesters, in particular those based on polyethylene glycol terephthalates or mixtures thereof with naturally occurring fibre materials, such as, in particular, wool or cellulose.

The dyestuff mixtures according to the invention, as a mixture with other disperse dyestuffs, are also outstandingly suitable for dyeing and printing hydrophobic synthetic materials.

The hydrophobic synthetic materials can be in the form of sheet-like or thread-like structures, and can be processed, for example, to yarns or woven, knitted or looped textile fabrics. The fibre goods mentioned can be dyed with the dyestuff mixtures according to the invention in a manner known per se, for example by the method of spin-dyeing, but preferably from an aqueous dispersion, if appropriate in the presence of carriers, at between 80 to about 110° C. by the exhaust process, or by the HT process in a dyeing autoclave at 110 to 140° C., as well as by the so-called thermofixing process, in which the goods are padded with the dye liquor and then fixed at about 180 to 230° C.

For this purpose, the dyestuffs are processed in a generally known manner to give dyeing preparations, for example by grinding in the presence of dispersing agents and/or fillers. Using the preparations, which have been dried in vacuo or by spraying, if appropriate, dyeing can be carried out in a so-called short or long liquor after addition of water, or padding or printing can be carried out.

The materials mentioned can be printed in a manner known per se, in which the dyestuff mixtures according to the invention are incorporated into a printing paste and the goods printed with the paste are treated at temperatures between 180 to 230° C. with HT steam or dry heat in order to fix the dyestuff, if appropriate in the presence of a carrier. Very deep red dyeings and prints with very good fastnesses, in particular with very good fastenesses to light, rubbing, heat setting, washing, water and thermomigration, are obtained in this manner.

The dyestuff mixtures according to the invention are also suitable for dyeing the above hydrophobic materials from organic solvents by the methods known in this context, and for bulk dyeing.

The superiority of the dyestuff mixtures according to the invention becomes particularly clear in dyeing from an aqueous dyebath under conditions of modern practice.

The conditions of modern practice mentioned are characterized by high winding densities of cheese and beam dyeings, short liquor ratios, that is to say high dyestuff concentrations, and high shearing forces in the dye liquor caused by high pump outputs. Even under these conditions, the dyestuff mixtures according to the invention do not tend to agglomerate, and there are no filter effects on the textile materials to be dyed. Homogeneous dyeings without differences in depth between the outer and the inner layers of the wound packages are thus obtained, and the dyeings show no abrasion. Finally, in pad dyeings and prints with the dyestuff mixtures according to the invention, a homogeneous, speck free appearance of the goods is also obtained.

The invention is described in more detail, but not limited, by the following examples. In the examples, parts denote "parts by weight" and percentages denote "percentages by weight", unless stated otherwise.

EXAMPLE 1

1) 271 parts of press cake of the dyestuff C.I. Disperse Red 82 and 14 parts of press cake of the dyestuff of the formula

in each case with a dyestuff content of 35%, were ground with 120 g of a ligninsulphonate in a sand mill down to a fine division of 90% smaller than 1 μm. The resulting ground paste was dried in a spray drier at an intake temperature of 140° C. and a discharge temperature of 60° C. A 45% dyestuff powder was thus obtained.

The resulting dyestuff powder was free from agglomerated particles which had stuck together, and could be redispersed in water with the required fine division without problems.

b) 0.5 g of the dyestuff powder from Example 1a) was stirred into 500 ml of water. 10 g of a polyester yarn densely wound on a cheese were introduced at 60° C. into the dye liquor thus obtained and were heated to 130° C. in the course of 30 minutes while pumping the dye liquor in circulation from the inside outwards. During the heating-up phase, specifically above 100° C., no irregularities, such as precipitation or recrystallization and reduction in flow and increase in pressure resulting therefrom, could be detected. After dyeing at this temperature for 30 minutes, the dyebath was cooled and the yarn wound on the cheese was rinsed and dried. The cheese showed no deposits on the inside and no dyestuff particles which had precipitated out, i.e. had not been dispersed completely in the dyebath, could be abraded from its surface. When the dyed yarn was unwound and knitted to a hose, the ends of this hose both showed the same depth in colour, i.e. the yarn on the cheese was dyed homogeneously on the inside and outside.

COMPARISON

When a 45% strength dyestuff powder was prepared only with C.I. Disperse Red 82 analogously to the instructions in Example 1a) and dyeing was carried out in accordance with the instructions of Example 1b), a cheese dyeing with significant dyestuff deposits which could easily be abraded was obtained. A hose produced from the yarn was not level between the ends, that is to say was not dyed homogeneously.

EXAMPLE 2

When a 40% strength dyestuff powder which comprised 92% of C.I. Disperse Red 82 and 8% of a dyestuff of the formula

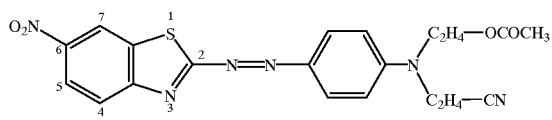

based on the pure dyestuff content, was prepared analogously to the instructions of Example 1a), a homogeneous dyeing result was also obtained when this powder was used for dyeing yarn or woven webs which were wound densely as is customary in practice.

EXAMPLE 3 a) 163 g of 2-cyano-4-nitroaniline were diazotized in 400 ml of concentrated sulphuric acid with 328 g of a 40% strength nitrosylsulphuric acid at 0 to 5° C. and coupled to a solution of 243 g of N,N-bis(acetoxyethyl)aniline and 26 g of N-(2-phenethyl)-N-(2-cyanoethyl)-aniline in 60% strength acetic acid at 5 to 10° C., while cooling directly with ice. The dyestuff mixture which precipitated out when the coupling had ended was filtered off, washed neutral with water and blown dry. A 25% strength water-moist press cake which comprised 90% of C.I. Disperse Red 82 and 10% of the dyestuff of the formula

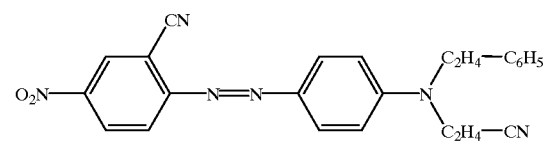

based on the pure dyestuff content, was obtained.

b) When a 45% strength dyestuff powder was prepared from the resulting dyestuff mixture in accordance with the instructions of Example 1a), this also gave excellent level dyeing results.

c) When 100 g of the press cake of Example 3a) were ground with 25 g of a ligninsulphonate in a bead mill down to a fine division of less than 1 μm, a 20% strength liquid formulation of this dyestuff mixture with excellent storage stability was obtained. When this liquid formulation was stored at 50° C. for several months, no deposits were found on the filters in the filter test customary in practice, and no specks were found on the dyed or printed fabric dyeing by the thermosol process and during printing. That is to say, during storage of this liquid preparation, the dispersion remained stable and no recrystallization with precipitation of the dispersed dyestuff particles occurred.

In contrast, a corresponding liquid formulation of the individual dyestuff led to sedimentation after only a short time under the same storage conditions.

We claim:

1. A disperse dyestuff mixture comprising a dyestuff of the formula (I)

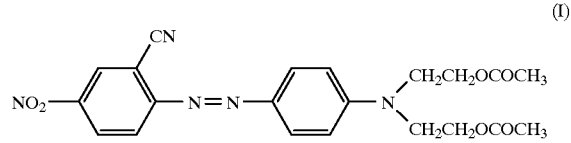

(I)

and at least one dyestuff which differs therefrom, of the formula (II)

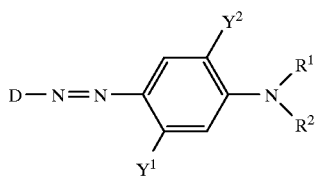

(II)

wherein
D represents 2-chloro-4-nitrophenyl or
D denotes the radical of a diazo component from the group consisting of 5, 6-dichlorobenzothiazol-2-yl, 6,7-dichlorobenzothiazol-2-yl, 6-nitrobenzothiazol-2-yl and 5-nitrothiazol-2-yl,
$Y^1$ represents acylamino, methoxy- or ethoxyacetamino, 2-methoxy- or -ethoxy-propionylamino, 2-chloro-propionylamino or methylsulfonylamino,
$Y^2$ represents hydrogen, and
$R^1$ and $R^2$ independently of one another denote unsubstituted or substituted $C_1$–$C_4$-alkyl.

2. A disperse dyestuff mixture according to claim 1, comprising at least one dyestuff of the formula (II) wherein
$Y^1$ represents acetamino, propionylamino, methoxy or ethoxyacetamino, 2-methoxy- or -ethoxypropionylamino, 2-chloropropionylamino or methylsulphonylamino and
$R^1$ and $R^2$ independently of one another represent methyl, ethyl, n-propyl, n-butyl, 2-acetoxyethyl, 2-propionyloxyethyl, 4-acetoxybutyl, 4-propionyloxybutyl, 2-cyanoethyl, 4-cyanobutyl, 2-methoxy-, -ethoxy-, or -propoxy- or -butoxyethyl, 4-methoxy- or -ethoxybutyl, 2-methoxy- or -ethoxycarbonylethyl, 3-methoxy- or -ethoxycarbonylpropyl, benzyl, 2-phenethyl or 2-phenoxyethyl.

3. A process for dyeing and printing hydrophobic synthetic materials wherein said materials are dyed with a dyestuff mixture according to claim 1.

4. The process according to claim 3 wherein the hydrophobic synthetic materials are fibres.

5. The process according to claim 3 wherein the hydrophobic synthetic materials are textiles of aromatic polyesters or mixed textiles of aromatic polyesters and cellulose esters or of aromatic polyesters and wool.

6. A dyestuff mixture according to claim 1, comprising the dyestuff of the formula (II) wherein
$Y^1$ represents acetamino, propionylamino, 2-methoxy-propionylamino or methylsulphonylamino.

7. Hydrophobic synthetic materials dyed with at least one dyestuff mixture according to claim 1.

8. A dyestuff preparation comprising
10–60% by weight of dyestuff mixture according to claim 1
10–80% by weight of anionic dispersing agent and
0 to 15% by weight of nonionic dispersing agent.

9. The dyestuff preparation according to claim 8, which is solid and comprises

| | |
|---|---|
| 10 to 50% by weight | of dyestuff said mixture |
| 10 to 80% by weight | of ligninsulphonates, |
| 0 to 20% by weight | of a condensation product of naphthalene-sulphonic acid and formaldehyde, |
| 0 to 10% by weight | of nonionic dispersing agent, |
| 0 to 1.5% by weight | of wetting agent, |
| 0.1 to 1% by weight | of defoamer and |
| 0.2 to 1.5% by weight | of dust removal agent. | in each case based on the total preparation.

10. The dyestuff preparation according to claim 8, which is solid and comprises

| | |
|---|---|
| 10 to 50% by weight | of said dyestuff mixture |
| 10 to 80% by weight | of kraft and sulphite lignins, |
| 0 to 20% by weight | of a condensation product of naphthalene-sulphonic acid and formaldehyde, |
| 0 to 10% by weight | of addition products of resin acids and ethylene oxide and/or propylene oxide, |
| 0 to 1.5% by weight | of wetting agent, |
| 0.1 to 1% by weight | of defoamer and |
| 0.2 to 1.5% by weight | of dust removal agent. | in each case based on the total preparation.

11. A process for the preparation of the dyestuff preparation according to claim 8 by:
a) mixing the separately prepared and separately finished individual dyestuffs,
b) joint finishing of the separately prepared individual dyestuffs or
c) joint synthesis of the dyestuff mixture.

* * * * *